(12) United States Patent
Chou et al.

(10) Patent No.: US 9,155,251 B2
(45) Date of Patent: Oct. 13, 2015

(54) PRODUCING METHOD FOR THE ARTIFICIAL PEAT MOSS FROM NATURAL CELLULOSE FIBER

(71) Applicant: Acelon Chemicals and Fiber Corporation, Changhua (TW)

(72) Inventors: Wen-Tung Chou, Changhua County (TW); Ming-Yi Lai, Changhua County (TW); Kun-Shan Huang, Tainan (TW)

(73) Assignee: ACELON CHEMICAL AND FIBER CORPORATION, Changhua County (TW)

( * ) Notice: Subject to any disclaimer, the term of this patent is extended or adjusted under 35 U.S.C. 154(b) by 340 days.

(21) Appl. No.: 13/776,970

(22) Filed: Feb. 26, 2013

(65) Prior Publication Data
US 2014/0165463 A1  Jun. 19, 2014

(30) Foreign Application Priority Data
Dec. 14, 2012  (TW) .............................. 101147471 A (51) Int. Cl.
| | |
|---|---|
| D02J 13/00 | (2006.01) |
| A01G 1/00 | (2006.01) |
| D01F 1/10 | (2006.01) |
| D01D 10/02 | (2006.01) |
| D01F 1/02 | (2006.01) |
| D01F 2/00 | (2006.01) |
| D01F 2/02 | (2006.01) |
| D02G 1/02 | (2006.01) |
| D01D 10/06 | (2006.01) |
| D01D 1/02 | (2006.01) |
| D01D 5/26 | (2006.01) |
| D01D 5/06 | (2006.01) |

(52) U.S. Cl.
CPC .................. *A01G 1/001* (2013.01); *D01D 1/02* (2013.01); *D01D 5/06* (2013.01); *D01D 5/26* (2013.01); *D01D 10/02* (2013.01); *D01D 10/06* (2013.01); *D01F 1/02* (2013.01); *D01F 1/10* (2013.01); *D01F 2/00* (2013.01); *D01F 2/02* (2013.01); *D02G 1/02* (2013.01); *D02G 1/0206* (2013.01)

(58) Field of Classification Search
CPC ............. D01D 1/02; D01D 5/06; D01D 5/26; D01D 10/02; D01D 10/06; D01F 1/02; D01F 1/10; D01F 2/00; D01F 2/02; D02G 1/02; D02G 1/0206; D02J 13/00
USPC ................... 264/103, 143, 187, 210.2, 210.8, 264/211.14, 211.15, 211.16, 211.17, 233, 264/234
See application file for complete search history.

(56) References Cited

U.S. PATENT DOCUMENTS

| | | |
|---|---|---|
| 6,890,651 B2 | 5/2005 | Bilkey |
| 7,726,069 B1 | 6/2010 | Zauche et al. |

*Primary Examiner* — Leo B Tentoni
(74) *Attorney, Agent, or Firm* — Bacon & Thomas, PLLC (57) ABSTRACT

The present invention provides a producing method for the artificial peat moss from natural cellulose fiber. The producing method comprises following steps in successive order manner. Firstly, blend natural pulp with N-methylmorpholine N-oxide (NMMO) as dissolving solvent and 1,3-phenylene-bis 2-oxazoline (BOX) as stabilizer in proper mixing ratio to yield a preliminary quasi-dope. Secondly, stir and dehydrate the preliminary quasi-dope to form dope. Thirdly, spin the dope by dry jet wet spinning method to yield filament bundle of cellulose. Fourthly, orderly perform coagulating with regenerating, water rinsing, twisting with plying and cutting processes on the filament bundle of cellulose to yield a preliminary artificial peat moss of natural cellulose fiber. Finally, per drying process of post-treatment on the preliminary artificial peat moss of natural cellulose fiber to obtain final artificial peat moss of natural cellulose fiber of the present invention.

9 Claims, 5 Drawing Sheets

PRODUCING METHOD FOR THE ARTIFICIAL PEAT MOSS FROM NATURAL CELLULOSE FIBER

FIELD OF THE PRESENT INVENTION

The present invention relates to a producing method for the artificial peat moss from natural cellulose fiber, which belongs to technical field in application of eco-friendly process of natural cellulose fiber. Wherein the spun filament bundle of cellulose are orderly performed by coagulating with regenerating, water rinsing, twisting with plying, cutting and drying processes to yield an artificial peat moss of natural cellulose fiber with a pH value in a range of 6.0-7.22 to reflect its neutrality and EC value approaching 0 mS/cm to reflect its cleanness being almost free from ion so that it is a neutral and clean growing media, which is excellent for cultivating orchids.

BACKGROUND OF THE INVENTION

Sphagnum is a genus of between 151 and 350 species of mosses commonly called sphagnum, or peat moss, due to its prevalence in wet habitats, where it contributes to the formation of peat bogs and mires. A distinction is sometimes made between "sphagnum moss", "sphagnum peat moss" and "sphagnum peat", wherein the "sphagnum moss" refers to the live moss growing on top of a peat bog while the "sphagnum peat moss" (American usage) and "sphagnum peat" (British usage) refer to moss slowly decaying underneath of the "sphagnum moss". Decayed, dried sphagnum moss has the name of peat or peat moss, which is used as a primary growing media of soil conditioner for cultivating orchids in Taiwan to increase the soil's capacity to hold water and nutrients by increasing capillary forces and cation exchange capacity. Currently, most sphagnum moss used in Taiwan is imported from Republic of Chile, New Zealand and Mainland China in annual amount about 1,100 tons. Owing to mass picking and collecting as well as flood ravage and natural ecocline associated with environmental changes, the annual production capacity is gradually decreased in recent years with result in soaring cost. Moreover, the natural sphagnum moss is seriously infected by *Fusarium oxysporum* or becomes a carrier of blight because it is usually picked and collected together with planted soil so that the quality thereof becomes unstable non-uniformity, which also affects the quality of the orchids cultivated by such bad natural sphagnum moss.

Therefore, an artificial peat moss fabricated by manufacturing technology of synthetic fiber or semi-synthetic fiber is emerged for coping with this marketing issue with features of high production efficiency, uniform quality and free from infection or carrier of blight so, that it becomes a trend to replace the natural sphagnum moss. However, all the sphagnum mosses of synthetic fiber or semi-synthetic fiber belong to polymers of polyester or polyamide by conventional process of viscose rayon, cuprammonium rayon, acetate or the like, which discharges a considerable amount polluted materials other than involving very complicated procedure with time-wasting slow production speed and soaring manufacturing cost. Moreover, the overall accumulated amount of all the polymers of polyester or polyamide, which are non-biodegradeable material, is direct proportional to the consumed amount of such kind of sphagnum mosses so that another economic issue is incurred by the increasing amount of accumulated wastes of used polyester or polyamide.

Having realized and addressed foregoing drawbacks for the conventional artificial peat moss of synthetic fiber or semi-synthetic fiber, the inventor of the present invention takes advantages of the successful technology in title of "processing method of the natural cellulose fiber with feature of enhanced antifungal, antiseptic and deodorant capability", which have been granted Taiwan patent in patent number of 1330208, and USA patent in patent number of U.S. Pat. No. 8,092,732 respectively, in addition to innovative idea for working out the present invention. The producing method for the artificial peat moss from natural cellulose fiber of the present invention proves itself that it meet requirement of growing media for cultivating orchids with features of production speed much higher than that of the conventional artificial peat moss of synthetic fiber or semi-synthetic fiber.

SUMMARY OF THE INVENTION

The primary object of the present invention is to provide a producing method for the artificial peat moss from natural cellulose fiber comprising following steps in successive order manner: firstly, blend natural pulp with N-methylmorpholine N-oxide (NMMO) as dissolving solvent and 1,3-phenylenebis 2-oxazoline (BOX) as stabilizer in proper mixing ratio to yield a preliminary quasi-dope; secondly, stir and dehydrate the preliminary quasi-dope to form dope; thirdly, spin the dope by dry jet wet spinning method to yield filament bundle of cellulose; fourthly, orderly perform coagulating with regenerating, water rinsing, twisting with plying and cutting processes on the filament bundle of cellulose to yield a preliminary artificial peat moss of natural cellulose fiber, and finally, per drying process of post-treatment on the preliminary artificial peat moss of natural cellulose fiber to obtain final artificial peat moss of natural cellulose fiber of the present invention. Wherein, a lateral feeding mode for a hollow spindle is adopted in the twisting process by fully plying a cover filament beforehand over the filament bundles of natural cellulose to be spun to prevent it from de-twisting in subsequent processing sub-steps so that not only the speed of mass production is quicker than conventional process of synthetic fiber or semi-synthetic fiber but also overall manufacturing cost can be substantially reduced with result in marketability and competitiveness for the present invention.

Another object of the present invention is to provide a producing method for the artificial peat moss from natural cellulose fiber, wherein added decay-resistant stabilizer has functions to decrease decay and simplify process as well as decrease the loss rate of the solvent so that the solvent can be fully reused recurrently with recovery factor reaching up to over 99.5% without environmental pollution incurred.

The other object of the present invention is to provide a producing method for the artificial peat moss from natural cellulose fiber, wherein the final product of artificial peat moss is biodegradeable fiber so that it meet requirement criterion of long-term environmental protection because its wastes will not become a pollution source.

DETAILED DESCRIPTION OF THE PREFERRED EMBODIMENTS

For further describing the processing procedure and efficiency of the present invention, the detailed description of experimental embodiments with associated drawings are disclosed as below. Please refer to the FIGS. 1 through 4. The processing procedure of the "producing method for artificial peat moss from natural cellulose fiber" comprises following steps in successive order manner:

a. Material Preparation and Solution Formation

Figure 1:
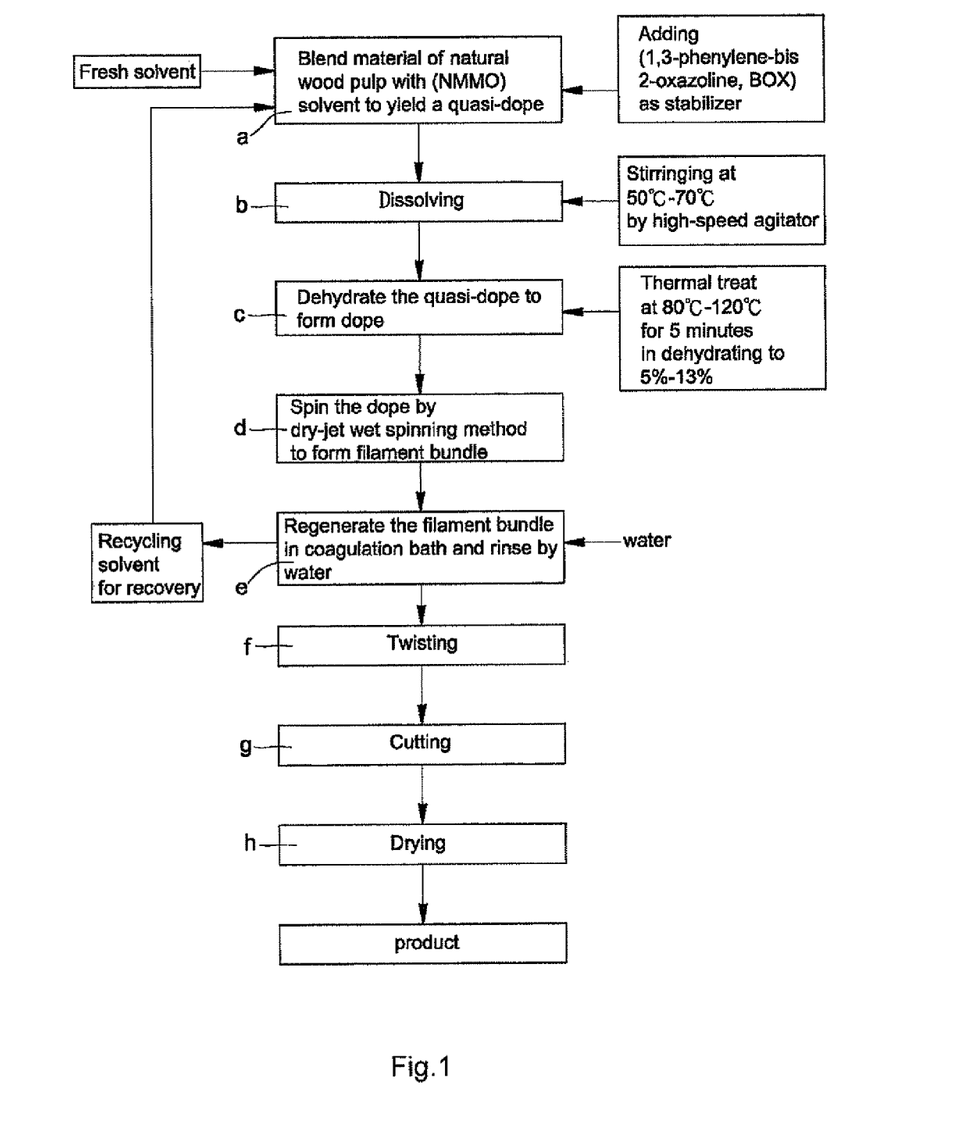
FIG. 1 is the flow chart of the processing procedure for the present invention.
Figure 2:
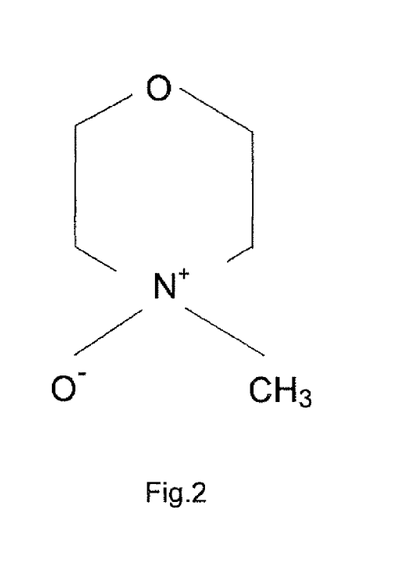
FIG. 2 is the chemical structure of the N-methylmorpholine N-oxide, called NMMO for short, used in the present invention.
Figure 3:
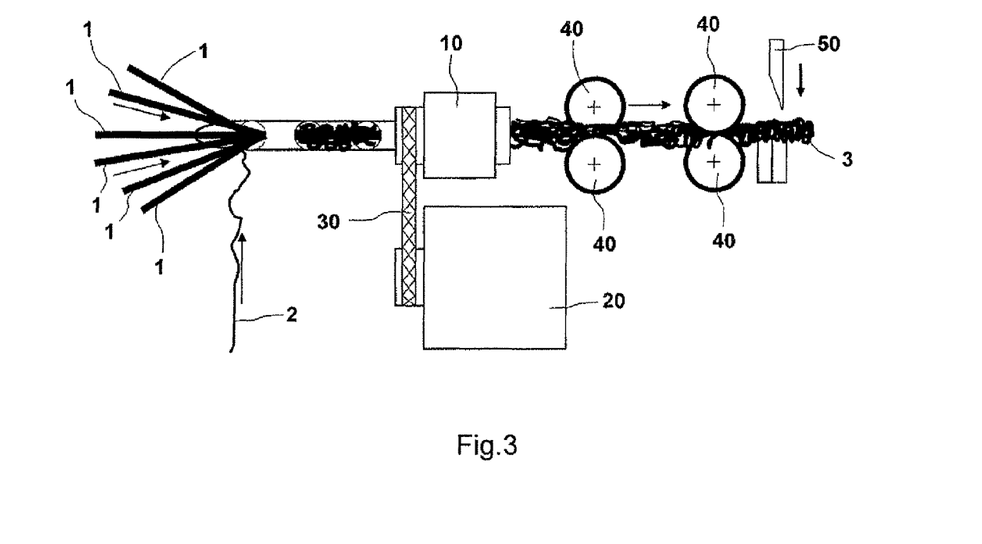
FIG. 3 is an operational schematic view showing a twisting process for a filament bundle of the present invention.
Figure 4:
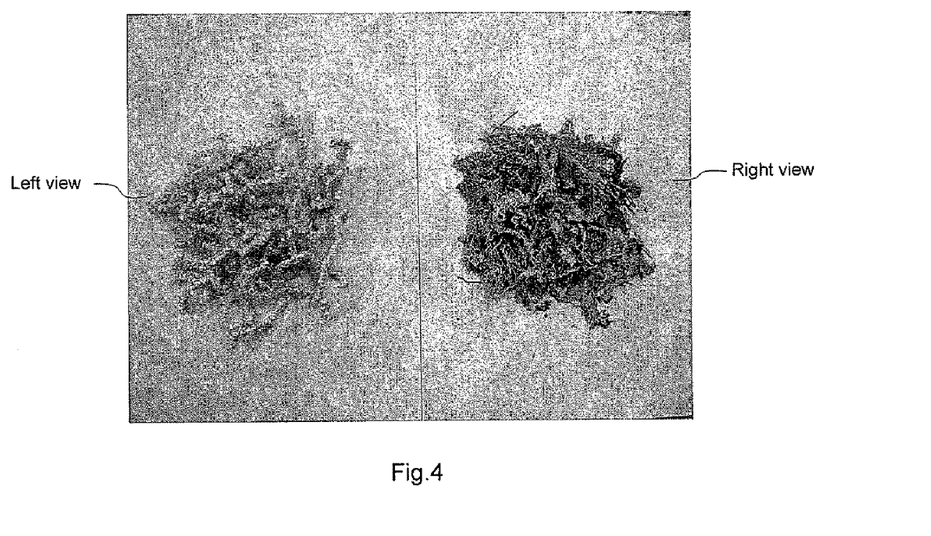
FIG. 4 are a pair of comparison views wherein right view shows an appearance for a natural sphagnum moss while left view shows an appearance for an artificial peat moss produced from natural cellulose fiber of the present invention.

Select wood pulp as raw material, preferably pulp cellulose of short staple or long filament with α-cellulose content being over 65% and a range for degree of polymerization (DP) between 500-1200, then put N-methylmorpholine N-oxide (NMMO) (whose chemical structure is shown in FIG. 2) in a concentration range between 45-75% as dissolving solvent and 1,3-phenylene-bis 2-oxazoline (BOX) as stabilizer into prepared pulp to yield a preliminary quasi-dope of mixed cellulose mucilage.

b. Agitation and Dissolution:

Stir the preliminary quasi-dope from previous step (a) under low temperature range between 50 degree of Celsius and 70 degree of Celsius (50° C.-70° C.) by high speed agitator and via excellent fluffing, moistening and lubricating features as well as high solubility and good dissolving speed of N-methylmorpholine N-oxide (NMMO) to achieve quickly blending and dissolving the preliminary quasi-dope.

c. Evaporation and Dope Formation:

Dehydrate the preliminary quasi-dope from previous step (b) by vacuum film evaporator for heating up to a temperature range between 80 degree of Celsius and 120 degree of Celsius (80° C.-120° C.) for 5 minutes to decrease water content thereof down to 5-13% so that a homogenized mucilaginous dope can be formed.

d. Spin and Filaments Formation:

Forcibly feed the dope from previous step (c) into spinning machine by metering pump, and spin the dope by dry jet wet spinning method for extruding the dope from the spinneret to yield filament bundle of cellulose.

e. Coagulation and Regeneration:

By means of ejecting mist aerosol of water, the filament bundle of cellulose from previous step (d) is coagulated in the coagulation bath with regeneration, and rinsed by clean water to become spinning tow that is an untwisted bundle of continuous filaments in denier number of 2,500 deniers.

f. Twisting to form Spun Yarn:

As shown in FIG. 3, perform twisting process for the untwisted bundle of continuous filaments form previous step (e) to include following sub-steps:

Firstly, a plurality of spinning tows or filament bundles of natural cellulose 1, which is fully plied by a cover filament 2 beforehand to prevent it from de-twisting in subsequent sub-steps, is laterally fed into a hollow spindle 10 for twisting process to form a spun yarn in overall denier number of 25,000-30,000 deniers; secondly, calender the twisted and plied filament bundles of natural cellulose 1 from previous sub-step by passing it through calender rollers 40; and finally, cut the calendered filament bundles of natural cellulose 1 from previous sub-step by a cutter 50 to produce artificial peat moss of natural cellulose 3, wherein the hollow spindle 10 is driven by a high-speed motor 20 via coupling of a cog belt or toothed belt 30 into a rotational speed range between 1,800-10,800 rpm to regulate the amount of twist thereof in the range between 200-1,200 twists per meter or turns per meter (TPM) so that the fluffing degree for the artificial peat moss of natural cellulose 3 is adapted to various values to meet different application requirements.

g. Cutting to Yield Growing Media:

Please refer to FIG. 3 Adjust the feeding frequencies for the calender rollers 40 and tungsten steel cutter 50 so that the length of the artificial peat moss of natural cellulose 3 is cut in range of 3-30 cm to make various growing media for different orchids.

h. Post-Treatment of Yield Artificial Peat Moss:

Dry the artificial peat moss of natural cellulose 3 cut from previous step (g) by a drum dryer for heating up to temperature range between 120 degree of Celsius and 150 degree of Celsius (120° C.-150° C.) for 30-60 minutes to obtain final product of artificial peat moss of natural cellulose 3 as left view shown in FIG. 4 to comparatively contrast with the natural sphagnum moss as right view shown in FIG. 4.

For understanding the properties of the artificial peat moss of natural cellulose 3 produced from foregoing process of the present invention, various experimental tests with comparative analyses are simultaneously performed on both of the artificial peat moss of natural cellulose 3 and natural sphagnum moss as below.

A. The measuring method for the physical properties in air-permeability and water-absorptivity etc. of the natural sphagnum moss versus another artificial peat moss produced from natural cellulose fiber of the present invention.

The general procedure in measuring method for normal physical properties of the natural sphagnum moss versus another artificial peat moss produced from natural cellulose fiber of the present invention is described as below.

1. Take two identical soft pots in diameter of 3.5 inches such that each soft pot has containing volume Vp to denote overall volume thereof as measuring container with each drainage bore in the bottom thereof being temporarily sealed in water-tight manner by suitably adhesive tape respectively, wherein one soft pot is used to hold a testing sample of the natural sphagnum moss while the other soft pot is used to hold another testing sample of the artificial peat moss produced from natural cellulose fiber of the present invention.

2. Fill each testing sample of the natural sphagnum moss and the artificial peat moss produced from natural cellulose fiber of the present invention into respective measuring soft pot in flush full manner so that each testing sample volume Vm is the same as containing volume Vp of the measuring soft pot, namely Vm=Vp.

3. Slowly add water into each testing sample in respective measuring soft pot up to saturation manner but without spillage due to overfilling or sample floating out of each measuring soft pot.

4. Keep each measuring soft pot still for 15 minutes to allow each testing sample for completely absorb added water in lower down manner of the water level, then slowly add water again into each testing sample in respective measuring soft pot up to saturation manner.

5. Measure and record overall quantity of adding water to each testing sample in respective measuring soft pot for denoting as Wadd respectively.

6. Tear off the adhesive tape sealed each drainage bore in the bottom of respective measuring soft pot to allow water therein naturally draining out for about an hour, then collect each drained water from each measuring soft pot of respective testing sample for denoting as Wdrop, which is the water quantity having not absorbed by each testing sample.

7. Take each testing sample out of respective measuring soft pot to weight it for denoting as W1, which is wet weight with absorbed water therein of each testing sample.

8. Bake each wetted testing sample respectively from previous step 7 into an oven under temperature range between 70 degree of Celsius and 80 degree of Celsius (70° C.-80° C.) for over 36 hours to weight it for denoting as W2, which is dry weight without absorbed water therein of each testing sample.

B. The definition and calculating formula for the physical properties in air-permeability and water-absorptivity etc. of the natural sphagnum moss versus another artificial peat moss produced from natural cellulose fiber of the present invention. By means of foregoing general procedure in measuring method for normal physical properties with notations for nomenclature of related terms, some key physical properties are defined as below.

1. Total porosity, which is abbreviated as (TP), denotes a maximal capacity of water absorbability in a certain volume of testing sample such that the specified value defines properties of maximal air-permeability and water-absorptivity.

Total porosity (TP)  $TP = \dfrac{\text{Overall water added (Wadd)}}{\text{Sample volume (Vm)}} \times 100\%$ 2. Container capacity, which is abbreviated as (CC), denotes a measured capacity of water absorbed in a certain volume of testing sample such that the measuring value defines property of measured water-absorbing capability.

Container capacity (CC),  $CC = \dfrac{\text{Wet weight (W1)} - \text{Dry weight (W2)}}{\text{Sample volume (Vm)}} \times 100\%$ 3. Moisture content, which is abbreviated as (MC), denotes a measured capacity of water absorbed in a certain weight of wetted testing sample such that the measuring value defines property of measured water-retaining capability.

Moisture content (MC)  $MC = \dfrac{\text{Wet weight (W1)} - \text{dry weight (W2)}}{\text{Wet weight (W1)}} \times 100\%$ 4. Air space, which is abbreviated as (AS), denotes a measured porosity of fluff in a certain volume of testing sample such that the measuring value defines property of measured air-permeability.

Air space (AS)  $AS = \dfrac{\text{Water weight not absorbed (Wdrop)}}{\text{Sample volume (Vm)}} \times 100\%$ 5. Water adsorptivity, which is abbreviated as (WA), denotes a measured capacity of water absorbed in a certain weight of dried testing sample such that the measuring value defines property of measured water adsorptivity.

Water adsorptivity (WA)  $MC = \dfrac{\text{wet weight (W1)} - \text{dry weight (W2)}}{\text{dry weight (W2)}} \times 100\%$ C. The measuring method and comparative analysis for the physical property in water-retentiveness of the natural sphagnum moss versus another artificial peat moss produced from natural cellulose fiber of the present invention.

The measuring method is processed as following: firstly, gradually add water into each testing sample previously deposed in a measuring container of known weight; secondly, bake each testing sample from previous step in an oven after weighting each of them respectively for drying process; thirdly, under certain conditions of constant temperature and relative humidity, successively weight each testing sample from previous step at different time to measure weight fluctuations in succeeding time intervals; fourthly, respectively bake each testing sample after stable equilibrium from previous step into an oven under temperature at 75 degree of Celsius (75° C.) for over 36 hours to measure its moisture content (MC), and finally, perform previous step in reiterative manner under different baking times, namely drying times.

Figure 5:
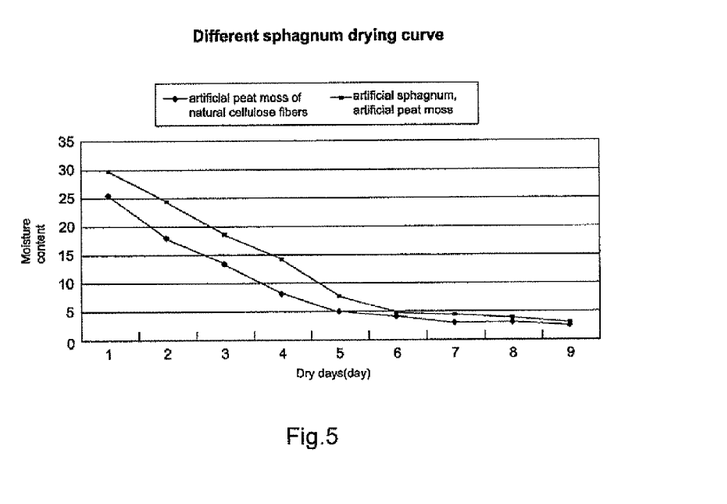
FIG. 5 is a comparison view for drying properties of characteristic curves, wherein pink (upper) characteristic curve shows a drying property for a natural sphagnum moss while blue (lower) characteristic curve shows a drying property for an artificial peat moss produced from natural cellulose fiber of the present invention.
Figure 6:
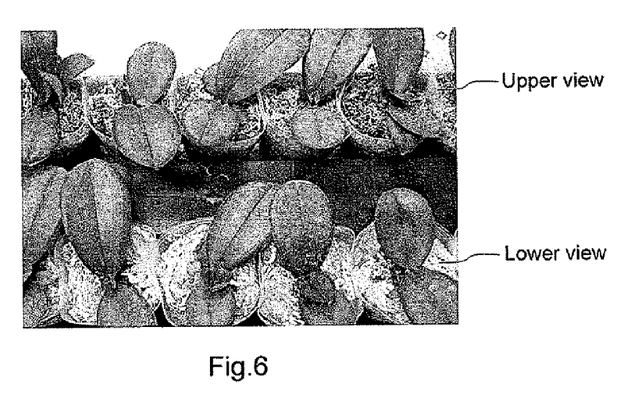
FIG. 6 are a first pair of comparison views for cultivation of phalaenopsis under same conditions wherein upper view shows a growing illustration of phalaenopsis by a natural sphagnum moss while lower view shows a growing illustration of phalaenopsis by an artificial peat moss produced from natural cellulose fiber of the present invention.
Figure 7:
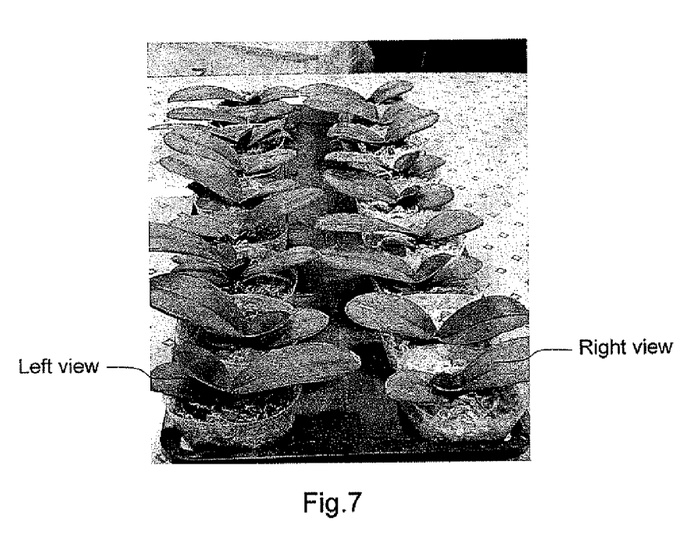
FIG. 7 are a second pair of comparison views for cultivation of phalaenopsis under same conditions wherein left view shows a growing illustration of phalaenopsis by a natural sphagnum moss while right view shows a growing illustration of phalaenopsis by an artificial peat moss produced from natural cellulose fiber of the present invention.
Figure 8:
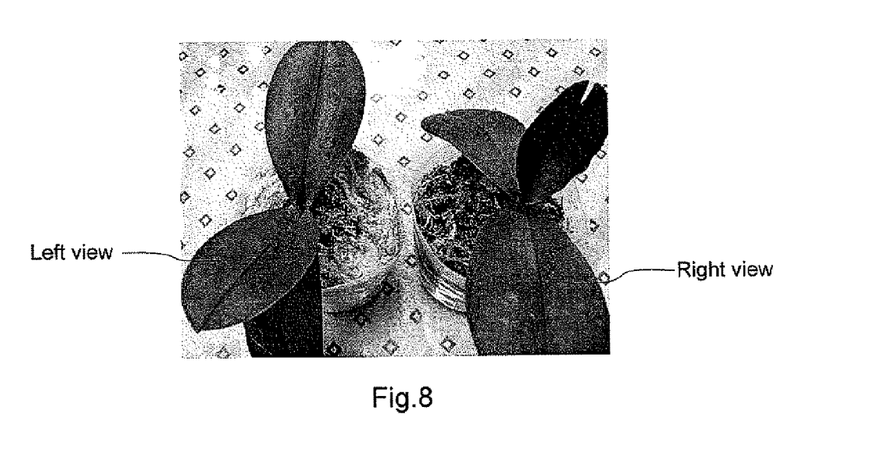
FIG. 8 are a third pair of comparison views for cultivation of phalaenopsis under same conditions wherein left view shows a growing illustration of phalaenopsis by a natural sphagnum moss while right view shows a growing illustration of phalaenopsis by an artificial peat moss produced from natural cellulose fiber of the present invention.

With foregoing procedure, a comparison view for drying properties of characteristic curves and a comparison table of water-absorptivity and air-permeability for NSM and APM are set up as shown in FIG. 5 and Table-1 respectively, wherein the FIG. 5 is attached in annexed drawing sheet while Table-1 is directly tabulated as below.

TABLE 1

Comparison of water-absorptivity and air-permeability for NSM and APM

| | Property | | | | |
| --- | --- | --- | --- | --- | --- |
| | Water-absorptivity | | | | Air-permeability |
| Sample | TP | WA | CC | MC | AS |
| N = NSM | 89.2 | 15.1 | 38.0 | 94.5 | 54.4 |
| A = APM | 94.7 | 16.6 | 37.1 | 93.2 | 68.8 |

Denotation
NSM = natural sphagnum moss
APM = artificial peat moss produced from natural cellulose fiber
TP = Total porosity
CC = Container capacity
MC = Moisture content
WA = Water adsorptivity
AS = Air space For interpreting the comparison view for drying properties of characteristic curves, please refer to FIG. 5, which is a comparison view for drying properties of characteristic curves figured by setting moisture content (MC) as vertical coordinate while setting drying time as horizontal coordinate, namely abscissa, wherein pink (upper) characteristic curve shows a drying property for a natural sphagnum moss while blue (lower) characteristic curve shows a drying property for an artificial peat moss produced from natural cellulose fiber of the present invention. Respective drying speed for each testing sample can be calculated from the illustrated comparison view for drying properties of characteristic curves with inference that the lower value of the drying speed, the better of the water retentiveness is.

Please refer to both of characteristic curves shown in FIG. 5. Regarding the moisture content (MC) for an artificial peat moss produced from natural cellulose fiber of the present invention as shown in the blue (lower) characteristic curve, it is in the range between 2,000-2,500% in the initial saturation of the first day while it remains in the range between 200-250% after having been dried for seven days. Regarding the moisture content (MC) for a natural sphagnum moss as shown in the pink (upper) characteristic curve, it is in the range between 2,000-3,000% in the initial saturation of first day while it remains in the range between 200-300% after having been dried for seven days. With comparative results indicated above, both of water retentiveness for a natural sphagnum moss and an artificial peat moss produced from natural cellulose fiber of the present invention are almost the same each other. For using a natural sphagnum moss or an artificial peat moss produced from natural cellulose fiber of the present invention as growing media in cultivation of the phalaenopsis, it water retentiveness is closely related to the nutrient retentiveness.

For interpreting the comparison of water-absorptivity and air-permeability for NSM and APM, please refer to Table-1-interpretation as below.

TABLE 1 interpretation with denotations shown in previous Table-1
For easiness of interpretation, N denotes NSM while A denotes APM.

| Sample | Property | | | | |
|---|---|---|---|---|---|
| | Water-absorptivity | | | | Air-permeability |
| | TP | WA | CC | MC | AS |
| N = NSM | 89.2 | 15.1 | 38.0 | 94.5 | 54.4 |
| A = APM | 94.7 | 16.6 | 37.1 | 93.2 | 68.8 |
| Comparison | A > N | A > N | A ≈ N | A ≈ N | A > N |
| Interpreting | A is better than N | | A nearly equals N | | A is better than N |

With foregoing Table-1-interpretation, it is self-explanatory that both of overall water-absorptivity and air-permeability for an artificial peat moss (APM) produced from natural cellulose fiber of the present invention are better than those for a natural sphagnum moss (NSM).

D. The measuring method and comparative analysis for the physical properties in pH value and EC value of the natural sphagnum moss versus another artificial peat moss produced from natural cellulose fiber of the present invention.

The measuring method is processed as following: firstly, randomly take each testing sample in weight 3 grams for a natural sphagnum moss and tan artificial peat moss produced from natural cellulose fiber of the present invention such that each testing sample is taken three times; secondly, add de-ions water in volume of 100 milliliters (mls) to soak each testing sample form previous step for 24 hours, and finally, measure the pH value by a DELTA 320 pH-meter and the EC value by a Suntex Sc-12 meter for each testing sample.

With foregoing procedure, a comparison table of key-properties for NSM and APM is set up as shown in Table-2 below.

TABLE 2

Comparison of key-properties for NSM and APM

| Testing sample | pH | EC (mS/cm) | DWP (g) | WAW (g) | TWP (g) | COP (N.T.D) |
|---|---|---|---|---|---|---|
| NSM | 3.2-4.8 | 0.14 | 12.4 | 16.20 | 200.9 | 2.23 |
| APM | 6.0-7.2 | 0.03 | 18.4 | 12.64 | 232.6 | 2.02 |

Denotation
NSM = natural *sphagnum* moss
APM = artificial peat moss produced from natural cellulose fiber
pH = An index of acidity/alkalinity of a solution
EC = Electrical Conductivity is measured in mS/cm (mini-Siemens per centimeter)
DWP = Dry weight of flowerpot
WAW = Weight of absorbed water per gram of moss
TWP = Total weight of flowerpot
COP = Cost of flowerpot For interpreting the comparison of key-properties for NSM and APM, please refer to Table-2-interpretation as below.

TABLE 2 interpretation with denotations shown in previous Table-2
For easiness of interpretation, N denotes NSM while A denotes APM.

| Testing sample | pH | EC (mS/cm) |
|---|---|---|
| NSM | 3.2-4.8 (acidity) | 0.14 (containing ions) |
| A = APM | 6.0-7.2 (neutrality) | 0.03 (approaching zero) |
| Comparison | A > N | A < N (0.14/0.03 ≈ 3) |
| Interpreting | A is better than N | A is better than N |

With foregoing Table-2-interpretation, the pH value for a natural sphagnum moss (NSM) is in a range of 3.2-4.8 so that it is a growing media of acidity, which has harmful effect to the plant. Whereas, the pH value for an artificial peat moss (APM) produced from natural cellulose fiber of the present invention is in a range of 6.0-7.2 so that it is a growing media of neutrality, which has no harmful effect to the plant. The EC value for a natural sphagnum moss (NSM) is 0.14 so that it is a growing media of containing ions, which has harmful effect to the plant. Whereas, the EC value for an artificial peat moss (APM) produced from natural cellulose fiber of the present invention is 0.03 so that it is a growing media almost without any ion contained therein, which has no harmful effect to the plant. Thus, it is self-explanatory that both of overall pH value and EC value for an artificial peat moss (APM) produced from natural cellulose fiber of the present invention are better than those for a natural sphagnum moss (NSM).

E. The cultivation test and comparative analysis for the growing status of seedling or young plant of phalaenopsis by applying growing media made of the natural sphagnum moss versus another artificial peat moss produced from natural cellulose fiber of the present invention.

The cultivation test is processed as under same conditions of normal fluffing degree for each testing growing media, usual fertilization and irrigation modes to cultivate the phalaenopsis for six months.

With foregoing procedure, a growing comparison table of phalaenopsis cultivation by NSM and APM is set up as shown in Table-3 below.

TABLE 3

Growing comparison of *phalaenopsis* - cultivation by NSM and APM under same conditions for six months

| Testing Sample | Factor | | | | | | | |
|---|---|---|---|---|---|---|---|---|
| | Leaf-related | | | Pedicel-related | | | Flower-related | |
| | TAL (cm$^2$) | ANL | LOL (cm) | NOP | LOP (cm) | DOP (cm) | DOB (%) | ANB | DOF (cm) |

| Testing Sample | TAL (cm$^2$) | ANL | LOL (cm) | NOP | LOP (cm) | DOP (cm) | DOB (%) | ANB | DOF (cm) |
|---|---|---|---|---|---|---|---|---|---|
| NSM | 459 | 7.1 | 36.5 | 1.1 | 64.2 | 0.49 | 100 | 17.9 | 8.0 |
| APM | 455 | 7 | 35.8 | 1.3 | 63.5 | 0.47 | 100 | 17.3 | 7.9 |

Denotation
NSM = natural *sphagnum* moss
APM = artificial peat moss produced from natural cellulose fiber
TAL = Total area of leaves
ANL = Average number of leaf
LOL = Length of leaf
NOP = Number of pedicel
LOP = Length of pedicel
DOP = Diameter of pedicel
DOB = Degree of blossom
ANB = Average number of blossom
DOF = Diameter of flower For interpreting the growing comparison of phalaenopsis-cultivation by NSM and APM under same conditions for six months, please refer to all factor-values shown in the Table-3-interpretation as below.

TABLE 3 interpretation with denotations shown in previous Table-3

| Testing Sample | Factor | | | | | | | | |
|---|---|---|---|---|---|---|---|---|---|
| | Leaf-related | | | Pedicel-related | | | Flower-related | | |
| | TAL (cm$^2$) | ANL | LOL (cm) | NOP | LOP (cm) | DOP (cm) | DOB (%) | ANB | DOF (cm) |
| NSM | 459 | 7.1 | 36.5 | 1.1 | 64.2 | 0.49 | 100 | 17.9 | 8.0 |
| APM | 455 | 7 | 35.8 | 1.3 | 63.5 | 0.47 | 100 | 17.3 | 7.9 |
| Comparison | APM ≈ NSM | | | APM ≈ NSM | | | APM ≈ NSM | | |
| | APM ≈ NSM for all factor-values shown above | | | | | | | | |

Interpreting APM aparly equals NSM without obvious difference

With foregoing Table-3-interpretation, all factor-values in the leaf-related group, pedicel-related group and flower-related group are almost equivalent for both of an artificial peat moss (APM) produced from natural cellulose fiber of the present invention and a natural sphagnum moss (NSM). Thus, it is self-explanatory that both of the artificial peat moss (APM) produced from natural cellulose fiber of the present invention and the natural sphagnum moss (NSM) almost have same growing effects for cultivation in seedling or young plant of phalaenopsis under same conditions for six months.

In conclusion of all disclosure heretofore, the artificial peat moss produced from natural cellulose fiber of the present invention has following advantages. Reflecting from the pH value, it is a neutral growing media without issue of acidification. Reflecting from the EC value, it is a clean growing media almost without any ion contained therein. Reflecting from the producing process, its original source is controllably pure without any issue such as non-uniformity quality, contamination, infection or carrier of blight incurred from different sources. Besides, a lateral feeding mode for a hollow spindle (10) is adopted in the twisting process so that not only the speed of mass production is quicker than conventional process of synthetic fiber or semi-synthetic fiber but also overall manufacturing cost can be substantially reduced with result in marketability and competitiveness for the present invention. Thereby, the present invention does have features of novelty, nonobviousness over prior arts and practical industrial applicability, which meets basic criterion of patentability. Accordingly, we submit the patent application of the present invention in accordance with related patent laws for your perusal.

What is claimed is:

1. A method for producing an artificial peat moss from natural cellulose fiber comprising the following steps in successive order:
   (a) producing a preliminary quasi-dope of mixed cellulose mucilage by combining a wood pulp with a dissolving solvent and a stabilizer, wherein the dissolving solvent is N-methylmorpholine N-oxide (NMMO) and the stabilizer is 1, 3-phenylene-bis 2-oxazoline (BOX);
   (b) blending and dissolving the preliminary quasi-dope of mixed cellulose mucilage of step (a) by stirring the preliminary quasi-dope of mixed cellulose mucilage at a temperature of 50° C.-70° C. in a high speed agitator;
   (c) producing a homogenized mucilaginous dope by dehydrating the blended and dissolved preliminary quasi-dope of mixed cellulose mucilage of step (b) in a vacuum film evaporator at a temperature of 80° C.-120° C. for 5 minutes;
   (d) producing a filament bundle of cellulose by feeding the homogenized mucilaginous dope of step (c) into a spinning machine via a metering pump, then spinning the homogenized mucilaginous dope and using a dry-jet wet spinning method to extrude the homogenized mucilaginous dope from the spinneret;
   (e) producing a plurality of spinning tows each comprising an untwisted bundle of continuous filaments of about 2,500 deniers by coagulating the filament bundle of cellulose of step (d) in a coagulation bath then rinsing the coagulated filament bundle of cellulose with water; and
   (f) producing the artificial peat moss by twisting, calendering and cutting the plurality of spinning tows of step (e) using the following sub-steps:
      (i) plying the plurality of spinning tows with a cover filament thereby preventing de-twisting of the spinning tows in subsequent sub-steps;
      (ii) forming a spun yarn of 25,000-30,000 deniers by laterally feeding the plurality of spinning tows of sub-step (i) into a hollow spindle and twisting the spindle, wherein the hollow spindle is twisted at a speed of 1,800-10,800 rpm thereby regulating the amount of twist to 200-1,200 twists per meter (TPM);
      (iii) calendering the spun yarn of substep (ii) by passing the spun yarn through calender rollers; and
      (iv) forming the artificial peat moss by cutting the calendered spun yarn of substep (iii) with a cutter.

2. The method of claim 1, wherein the method comprises an additional step (g) as follows:
   (g) drying the artificial peat moss of step (f) by heating the artificial peat moss in a drum dryer at a temperature of 120° C.-15° C. for 30-60 minutes.

3. The method of claim 1, wherein the concentration of the N-methylmorpholine N-oxide (NMMO) in step (a) is 45-75%.

4. The method of claim 1, wherein the pH of the artificial peat moss is 6.0-7.2.

5. The method of claim 1, wherein the Electrical Conductivity (EC) value of the artificial peat is lower than the EC value of natural sphagnum moss.

6. The method of claim 1, wherein the wood pulp comprises pulp cellulose of short staple or long filament with an a-cellulose content of over 65% and a degree of polymerization (DP) of 500-1200.

7. The method of claim 1, wherein step (c) decreases the water content of the blended and dissolved preliminary quasi-dope of mixed cellulose mucilage of step (b) by 5%-13%.

8. The method of claim 1, wherein in step (f) the feeding frequencies for the calender rollers and the cutter are adjusted so that so the length of the artificial peat moss is 3cm - 30 cm.

9. The method of claim 1, wherein the hollow spindle of step (f) is driven by a high-speed motor by using a cog belt or toothed belt to couple the hollow spindle to the high-speed motor.

* * * * *